April 19, 1960  R. CORDELL  2,933,302
ELECTRONIC LOAD INDICATOR
Filed July 25, 1955
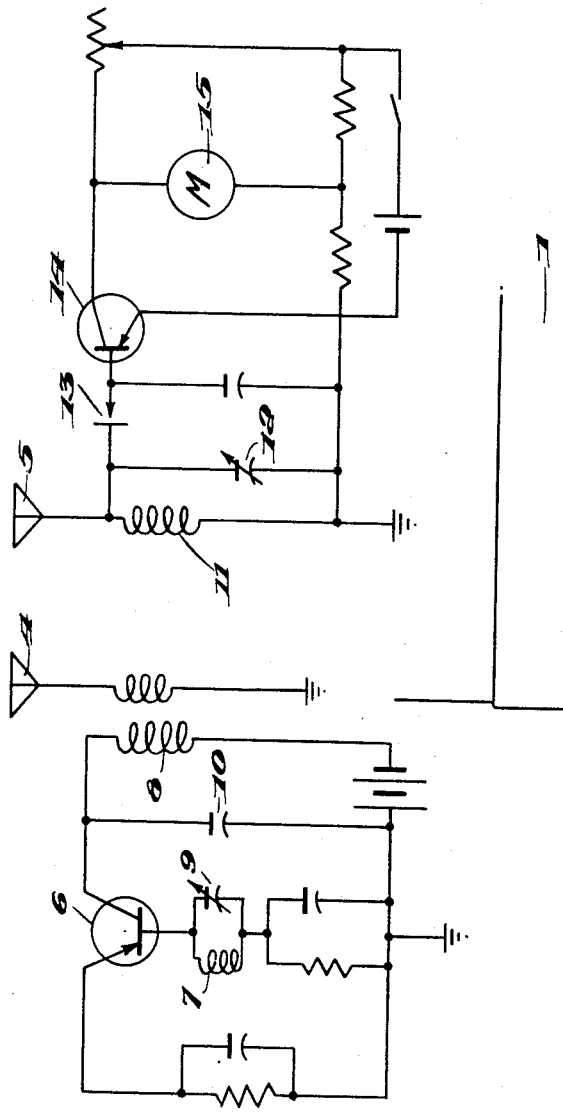
INVENTOR
RALPH CORDELL,
BY Larson and Whiting
ATTORNEYS United States Patent Office 2,933,302
Patented Apr. 19, 1960

2,933,302

ELECTRONIC LOAD INDICATOR

Ralph Cordell, Evansville, Ind., assignor to Ken Standard Corp., Evansville, Ind., a corporation of Indiana Application July 25, 1955, Serial No. 524,193

1 Claim. (Cl. 265—40)

This invention relates to a device for measuring load weights of vehicles and more particularly to an electronic equipment which is adapted to be mounted on a truck body to give an indication of the load weight in the truck.

It is well known that the correct loading of vehicles and, specifically, trucks is a major problem. Roads and pavements are severely damaged as a result of the passage of an over-loaded truck and, consequently, States require weighing of all trucks and severely penalize truck owners for overloading the vehicles. It can be seen that on a transcontinental run a trucker may spend considerable time at weighing stations in various States. It is also time consuming and unprofitable for the States to maintain these weighing stations and to provide the personnel necessary to enforce the regulations. It is obvious, therefore, that a real need exists for a truck weighing system which is economical and easily operated.

Various proposals have been made heretofore for overcoming the above-mentioned problems. The prior art shows various attempts to provide weighing devices which may be included in the equipment of each truck. Such devices failed, however, for the reason that due consideration was not given to the conditions under which these devices must operate. It is apparent that weighing devices when mounted on truck bodies will necessarily be subjected to unusually severe operating conditions. Such devices are generally disposed between the truck body and the axle and are subjected to the mud, rocks and water which is thrown up by the truck wheels. In addition to this, the axle twists with respect to the truck body and also turns in the plane of its longitudinal axis. There have been no devices manufactured to date which will give an accurate indication of the weight load on the truck under these conditions.

The present invention overcomes the above-mentioned difficulties by providing a mechanism which requires no electrical or mechanical connection between the truck body and the axle. Thus, unlimited degrees of motion between these elements can occur without affecting the measuring instrument. Furthermore, the present invention provides a measuring device in which all of the sensitive parts may be encased in a waterproof container, the only exposed elements being antennas in the form of plates or loops or the like. These advantageous features are attained by utilizing an electronic device which will transmit a signal and by providing a receiver to receive this signal which incorporates a meter for registering the strength of the received signal. The strength of the signal is inversely proportional to the square of the distance between the sending and receiving sets. Thus, by mounting the sending and receiving sets on the truck body and axle respectively, and by calibrating the meter appropriately, an accurate indication will be given of the weight load in the truck body. The meter may be mounted in the cab of the truck with a switch for closing the circuit. When the trucker wishes to know the weight load in the truck body, he simply presses the switch and the oscillator or transmitting set will transmit a radio frequency signal which is received by the receiving set and the strength of this signal is recorded on the meter.

The circuits utilized for the transmitter and receiver may most advantageously utilize transistors. Transistors have advantages over ordinary vacuum tubes in this device for the reason that transistors are relatively small and thereby a more compact unit may be produced and transistors may not require as much voltage as vacuum tubes. By reason of this latter fact both the transmitter and receiver may operate from a single small source of electricity. While a specific circuit is disclosed herein for both the transmitter and receiver, it is readily apparent that the particular circuit used is not significant inasmuch as any oscillating and receiving circuit having low power requirements would serve equally as well.

An object of the present invention is to provide a device for measuring the weight load of a truck or like vehicle.

Another object of the present invention is to provide a truck load measuring device which does not require any mechanical interconnection between the truck body and the axle.

Other objects and many of the attendant advantages of the present invention will be readily appreciated upon consideration of the following detailed specification when taken in connection with the accompanying drawing wherein:

Fig. 1 is a rear elevational view of a truck body showing the mountings for the oscillator and receiver.

Fig. 2 is a diagrammatic view of the circuit used for the transmitter and oscillator, and Fig. 3 is a sectional view along the lines 3—3 of Fig. 1.

Referring now more particularly to the drawing wherein like numerals indicate like parts throughout the several views there is shown in Fig. 1 a truck body 1 which is supported from an axle 2 by means of springs 3. It is well known that as the load in the truck body 1 increases the distance between the body 1 and axle 2 decreases.

Mounted on the truck body 1 is a transmitting antenna 4. This antenna may be in the form of a metallic plate or, if desired, may be in the form of a loop antenna. Mounted on the axle 2 is a receiving antenna which may be in the form of a curved plate as shown in Fig. 3 or may be of any convenient size and shape. However, it is important that the receiving antenna fit around a segment of the axle for reasons which will become more fully apparent hereinafter.

The antenna 4 is connected to a transmitting circuit such as shown in Fig. 2. This circuit utilizes a transistor 6 in a tuned base and emitter circuit. By changing the values of the inductances 7 and 8 and the capacitors 9 and 10 various frequencies up to 50 megacycles may be obtained. The circuit functions as a small power radio transmitter and can be tuned to certain set frequency bands. A description of the circuits disclosed appears in a text "Transistors" published in 1954 by the Gernsback Publications of New York.

The receiver has means for detecting the signals received in the form of antenna 5 which is connected in the circuit shown in Fig. 2 that includes an inductance 11 and variable condenser 12 which is adjusted to resonate at the desired frequency. A rectifier 13 and amplifying transistor 14 deliver current to the meter 15 for measurement of the signal detected. The circuit disclosed is fundamentally a diode tuned microammeter and when used in the arrangement disclosed is commonly referred to as a field strength meter.

The device as disclosed functions in the following manner. The transmitter circuit transmits a signal of a predetermined frequency through antenna 4. The receiver circuit is set to resonate at this predetermined frequency and the signal received at antenna 5 is rectified and amplified and measured by the meter. The strength of the received signal is inversely proportional to the square of the distance between the transmitting and receiving antennas this distance, in turn, is proportional to the weight load in the vehicle. Thus, it can be seen that the current as recorded by the meter is indicative of the weight load in the vehicle.

It is apparent that a single set of antennas may be provided between the truck body and axle and the meter preset at zero under no load conditions. The meter can then be suitably calibrated to indicate the load in the vehicle body. The action of the meter is not linear for the reason that as the antennas move into closer proximity the strength of the received signal increases greatly with a small decrease in distance. On the other hand, the supporting springs 3 deflect less per unit of weight applied as they reach the limit of their capacity. For this reason, a more accurate indication of load applied is shown on the meter as the load becomes greater and approaches the load limit of the vehicle.

The present invention also contemplates the provision of a set of antennas on each side of each axle. The receiving antennas are connected in series to the receiver circuit and the meter will record the sum of the signals received by each of the antennas. Thus, the meter will instantaneously give an accurate indication of the load on the vehicle body. If desired, a switching arrangement could be provided whereby the series connection of the receiving antennas is broken and each receiving antenna is individually connected with the receiving unit and meter so that a selective axle weight is shown. In this manner the weight distribution on the axles of the vehicle may be readily determined.

It is also envisioned that the present invention could be used in connection with determining the center of gravity of an aircraft. A receiving circuit could be provided on each of the three wheel struts and a transmitting circuit mounted on the fuselage. The meters in the receiving circuit could be arranged so that when the load in the aircraft is properly placed, all of the meters will indicate a proper reading. It is also possible in this connection to utilize a different type of circuit wherein an inductance-capacitance tuned oscillator is capacitance coupled to a super regenerative receiver. Such circuits are well-known and one type of circuit suitable for this purpose may be found on pages 164 to 167 of "Science and Mechanics" magazine of December 1954. In this arrangement, the inductance coil of the oscillator is tuned by a metal plate placed on the ground under the oscillator coil. The variations in the signal reading indicated on the meter will increase or decrease in proportion to the distance between the coil and metal plate. By shielding the coil any interference due to other metal parts may be avoided. It can be seen that one such circuit could be provided at each contact point between the plane and ground and suitable meters could be provided to show whether or not the wheel struts are carrying the desired load to provide correct weight distribution.

The presently disclosed vehicle load measuring device is exceedingly simple to use and is not subject to the disadvantages of prior gauges which are referred to hereinbefore. The meter may be located in the vehicle cab where the driver can readily observe it. It is also possible to provide an additional socket for a meter at the rear of the vehicle. This socket will be used when loading the truck or trailer for observation at loading time.

Obviously, many modifications and variations of the present invention are possible in the light of the above teachings.

What is claimed as new and desired to be secured by Letters Patent is:

In a device for measuring the weight on a truck, said truck comprising an axle, a body, and spring means supporting the body on the axle; a radiation transmitter mounted on one of the truck body and axle, a radiation receiver mounted on the other of said body and axle, means for supplying high frequency energy to said transmitter whereby it radiates a signal, said receiver being generally vertically aligned with said transmitter, means including an antenna connected with said receiver for detecting signals radiated by said transmitter, and means for measuring and indicating the strength of the received signals thereby to indicate the distance between the said body and axle and, therefore, to indicate the load on the said body.

References Cited in the file of this patent

UNITED STATES PATENTS

| | | |
|---|---|---|
| 1,407,078 | Murray | Feb. 21, 1922 |
| 1,621,093 | Troll | Mar. 15, 1927 |
| 1,883,476 | Bartsch | Oct. 18, 1932 |
| 1,979,297 | Taylor et al. | Nov. 6, 1934 |
| 2,034,520 | Leib | Mar. 17, 1936 |
| 2,161,698 | Clark | June 6, 1939 |
| 2,206,793 | Staubly | July 2, 1940 |
| 2,314,883 | Herson | Mar. 30, 1943 |
| 2,437,608 | Long | Mar. 9, 1948 |
| 2,506,585 | Elliott | May 9, 1950 |
| 2,687,293 | Jackson | Aug. 24, 1954 |
| 2,792,209 | Allen | May 14, 1957 |